(12) United States Patent
Ma et al.

(10) Patent No.: US 10,473,366 B2
(45) Date of Patent: Nov. 12, 2019

(54) HEAT TRANSFER SYSTEM WITH PHASE CHANGE COMPOSITION

(71) Applicant: Carrier Corporation, Farmington, CT (US)

(72) Inventors: Zidu Ma, Ellington, CT (US); Ivan Rydkin, Rochester, NY (US); Warren Clough, Cicero, NY (US); Mary Teresa Lombardo, Windsor, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 100 days.

(21) Appl. No.: 15/512,378

(22) PCT Filed: Aug. 19, 2015

(86) PCT No.: PCT/US2015/045938
§ 371 (c)(1),
(2) Date: Mar. 17, 2017

(87) PCT Pub. No.: WO2016/043913
PCT Pub. Date: Mar. 24, 2016

(65) Prior Publication Data
US 2017/0307263 A1    Oct. 26, 2017

Related U.S. Application Data

(60) Provisional application No. 62/052,264, filed on Sep. 18, 2014.

(51) Int. Cl.
*F25B 25/00* (2006.01)
*F28D 20/02* (2006.01)

(52) U.S. Cl.
CPC ............ *F25B 25/005* (2013.01); *F28D 20/02* (2013.01); *Y02E 60/145* (2013.01)

(58) Field of Classification Search
CPC ....... C09K 5/063; Y02E 60/145; F28D 20/02; F25B 25/005
See application file for complete search history.

(56) References Cited

U.S. PATENT DOCUMENTS 6,319,599 B1    11/2001    Buckley
6,574,971 B2    6/2003    Suppes
(Continued)

FOREIGN PATENT DOCUMENTS

CN    102268243 A    12/2011
CN    102405270 A    4/2012
(Continued)

OTHER PUBLICATIONS

Gemma Tarlach: "How Phase Change Materials Can Keep Your Coffee Hot", Discover Magazine, Aug. 20, 2013.
(Continued)

*Primary Examiner* — Christopher R Zerphey
(74) *Attorney, Agent, or Firm* — Cantor Colburn LLP

(57) ABSTRACT

A heat transfer system is disclosed that includes a heat exchanger comprising an inlet, an outlet, and a flow path through the heat exchanger between the inlet and the outlet. The system also includes a fluid circulation loop external to the heat exchanger connecting the outlet to the inlet. A phase change composition is disposed in the system flowing through the fluid circulation loop and the flow path through the heat exchanger. This the phase change composition includes a first PCM that is a plant or animal or paraffinic oil having a first melting point and a second PCM that is a plant or animal or paraffinic oil having a second melting point lower than the first melting point.

7 Claims, 3 Drawing Sheets

(56) References Cited

U.S. PATENT DOCUMENTS

| | | |
|---|---|---|
| 7,836,722 B2 | 11/2010 | Magill et al. |
| 7,914,891 B2 | 3/2011 | Amundson et al. |
| 8,360,546 B2 | 1/2013 | Iftime et al. |
| 8,480,852 B2 | 7/2013 | Wenzel et al. |
| 2011/0056622 A1 | 3/2011 | Booska |
| 2011/0123584 A1 | 5/2011 | Seidling |
| 2011/0124769 A1 | 5/2011 | Moen |
| 2013/0228308 A1 | 9/2013 | Abhari |
| 2013/0234061 A1 | 9/2013 | Davis |
| 2013/0296449 A1 | 11/2013 | Peterson et al. |

FOREIGN PATENT DOCUMENTS

| | | |
|---|---|---|
| EP | 0353992 A2 | 2/1990 |
| EP | 0353992 A | 7/1990 |
| WO | 2011084728 A1 | 7/2011 |
| WO | 2011099871 A1 | 8/2011 |
| WO | 2012166650 A1 | 12/2012 |
| WO | 2014065938 A1 | 5/2014 |

OTHER PUBLICATIONS

Mondal, S., "Phase change materials for smart textiles—An overview", Applied Thermal Engineering 28 (2008); pp. 1536-1550.
Search Report and Written Opinion regarding related PCT App. No. PCT/US2015/045938; dated Dec. 4, 2015; 10 pgs.
Chinese Office Action and Search Report from the Chinese Patent Office for CN Application No. 201580050190.0 dated Oct. 9, 2018, 15 pages, with English Translation.

HEAT TRANSFER SYSTEM WITH PHASE CHANGE COMPOSITION

CROSS-REFERENCE TO RELATED APPLICATIONS

This patent application is a National Stage application of International patent Application Serial No. PCT/US2015/045938, filed Aug. 19, 2015, which claims the benefit of priority to U.S. Provisional Patent Application Ser. No. 62/052,264, filed Sep. 18, 2014, both of which are incorporated herein by reference in their entirety.

BACKGROUND OF THE INVENTION

The subject matter disclosed herein generally relates to heat transfer systems and their operation, and more specifically to heat transfer systems utilizing phase change materials.

Phase change materials (PCMs) have been disclosed for use in various applications such as HVAC&R (heating, ventilation, air conditioning and refrigeration) and heat management for electronic components. Phase change materials offer benefits in the area of thermal management due to their high specific heat values compared to non-phase change thermal materials. Many applications of phase change materials have utilized passive heat transfer to and from a phase change material where the phase change material functions as a type of thermal buffer where it either absorbs or releases heat to the surrounding environment depending on the respective temperatures of the PCM and the surrounding environment. Such systems can be effective, but are subject to limitations on the efficiency of heat transfer rates based on effective surface area and thermal transport limitations.

Active heat transfer systems have also been proposed where a heat transfer fluid is pumped or otherwise caused to flow through or past a static PCM. Although such systems can provide heat transfer rate improvements compared to static systems, they often require additional complexity to configure a PCM to maintain a large surface area of PCM in its phase changing state at the interface with the heat transfer fluid. For example, when liquid PCM transitions to solid PCM at the interface with the heat transfer fluid, the solid PCM, having lower thermal conductivity than in liquid state, acts as a thermal barrier between the flowing a heat transfer fluid and the remaining PCM in its liquid state. Additionally, such systems are also subject to efficiency limitations inherent to the heat transfer fluid loop that is used to transfer heat to or away from the phase change material. PCM slurries have been proposed as a way to overcome some of these limitations by allowing the phase change material to be flow as a fluid so that the PCM can be delivered to the location where heat is desired to be delivered or absorbed instead of transferring heat between such a location and a static PCM through the use of a heat transfer fluid. However, PCM slurries have not achieved widespread commercial success due to a number of issues. Typically, PCM slurries contain a non-PCM liquid as a carrier with a PCM material dispersed therein that can transition between a liquid state and a solid state. The PCM material in a PCM slurry is typically contained in microcapsules or is emulsified as micro-droplets/particles in the carrier liquid. The fabrication of PCM-containing microcapsules adds to the complexity and expense of the material, and the microcapsule walls also act as an insulator reducing the thermal conductivity between the fluid and the PCM material. Additionally, materials that undergo any significant volume change during phase change can compromise the structure of the microcapsules after repeated phase change cycles. PCM emulsion slurries can be difficult to maintain as a stable emulsion over repeated phase change cycles, and are limited in the selection of materials that provide effective phase change performance in the desired temperature range and also form a stable emulsion. The requirement for emulsifying agents can also adversely impact both cost and performance of the system. Limitations on the amount of encapsulated or emulsified PCM that can be effectively dispersed in a liquid carrier can also limit the effectiveness of PCM slurries. Additionally, a problem common to many types of PCM materials is that the PCM material often has a limited temperature range over which the phase change occurs, limiting their effectiveness in heat transfer systems that operate over a wide range of temperatures.

BRIEF DESCRIPTION OF THE INVENTION

According to one aspect of the invention, a heat transfer system includes a heat exchanger comprising an inlet, an outlet, and a flow path through the heat exchanger between the inlet and the outlet. The system also includes a fluid circulation loop external to the heat exchanger connecting the outlet to the inlet. A phase change composition is disposed in the system flowing through the fluid circulation loop and the flow path through the heat exchanger. This the phase change composition comprises a first PCM that is a plant or animal or paraffinic oil having a first melting point or solidification temperature and a second PCM that is a plant or animal or paraffinic oil having a second melting point or solidification temperature lower than the first melting point or solidification temperature. If the flow path through the heat exchanger is in heat absorption mode and the second PCM is in a solid state, the system provides phase change performance (i.e., transfers heat from the phase change composition through the latent heat of fusion of the second PCM) if a surface of the flow path through the heat exchanger in contact with the phase change composition has a temperature at or above the second melting point. If the flow path through the heat exchanger is in heat rejection mode and the first PCM is in a liquid state, the system provides phase change performance (i.e., transfers heat to the phase change composition through the latent heat of fusion of the first PCM) if a surface of the flow path through the heat exchanger in contact with the phase change composition has a temperature at or below the first solidification temperature.

In another aspect of the invention, a method of transferring heat comprises flowing a phase change composition through a flow path in a heat exchanger between an inlet and an outlet of the heat exchanger, and a fluid circulation loop external to the heat exchanger connecting the outlet to the inlet. The phase change composition comprises a first PCM that is a plant or animal or paraffinic oil having a first melting point or solidification temperature and a second PCM that is a plant or animal or paraffinic oil having a second melting point or solidification temperature lower than the first melting point or solidification temperature. If the flow path through the heat exchanger is in heat absorption mode, a surface of the flow path through the heat exchanger in contact with the phase change composition has a temperature at or above the second melting point or solidification temperature. If the flow path through the heat exchanger is in heat rejection mode, a surface of the flow path through the heat exchanger in contact with the phase change composition has a temperature at or below the first solidification temperature.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
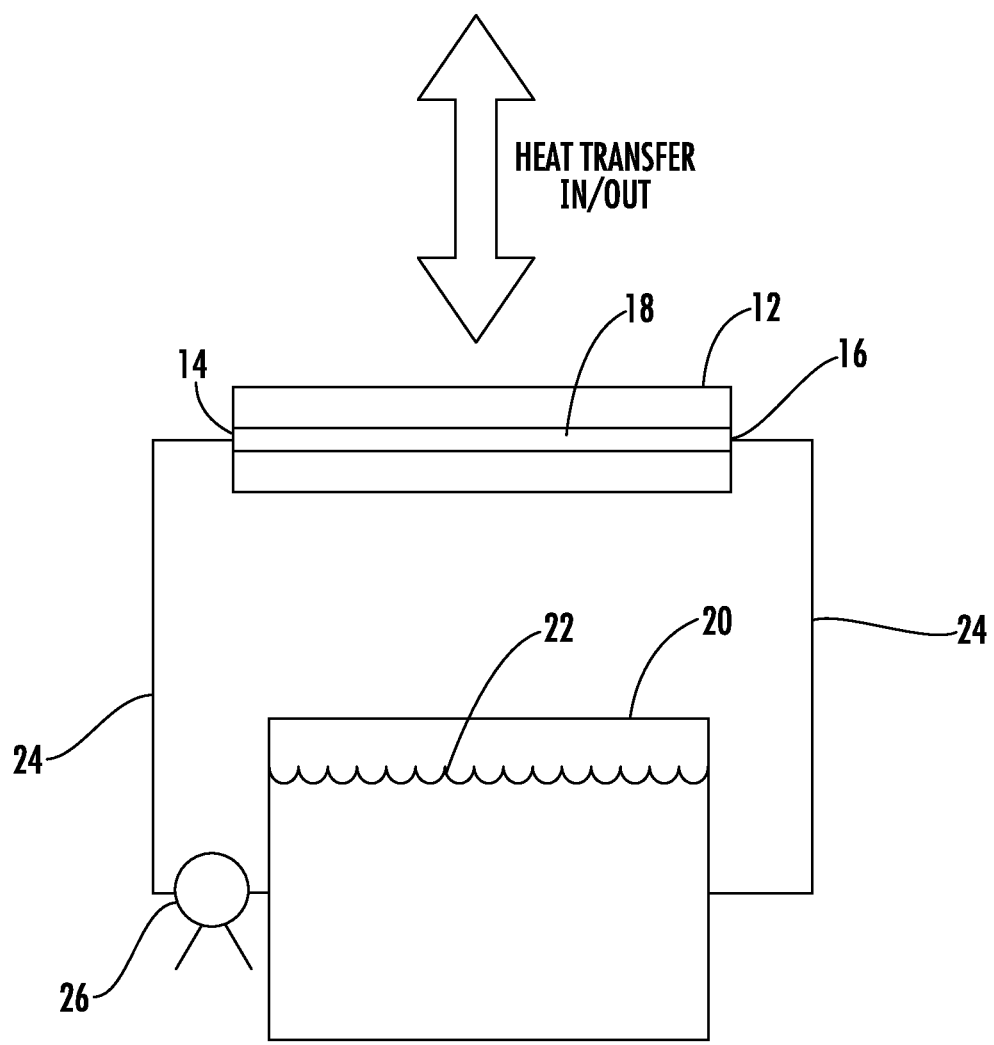
FIG. 1 is a block schematic diagram depicting an exemplary embodiment of a refrigeration system as described herein.

An exemplary heat transfer system is schematically illustrated in FIG. 1. As shown in FIG. 1, a heat exchanger 12 has an inlet 14, an outlet 16, and a flow path 18 through the heat exchanger 12. A PCM reservoir 20 contains a phase change composition 22. The phase change composition 22 is pumped through flow loop 24 by pump 26 to circulate through the flow path 18 in heat exchanger 12. Heat is depicted as transferring in or out of the heat exchanger 12 to transfer heat to or from the phase change composition flowing through flow path 18.

Figure 2:
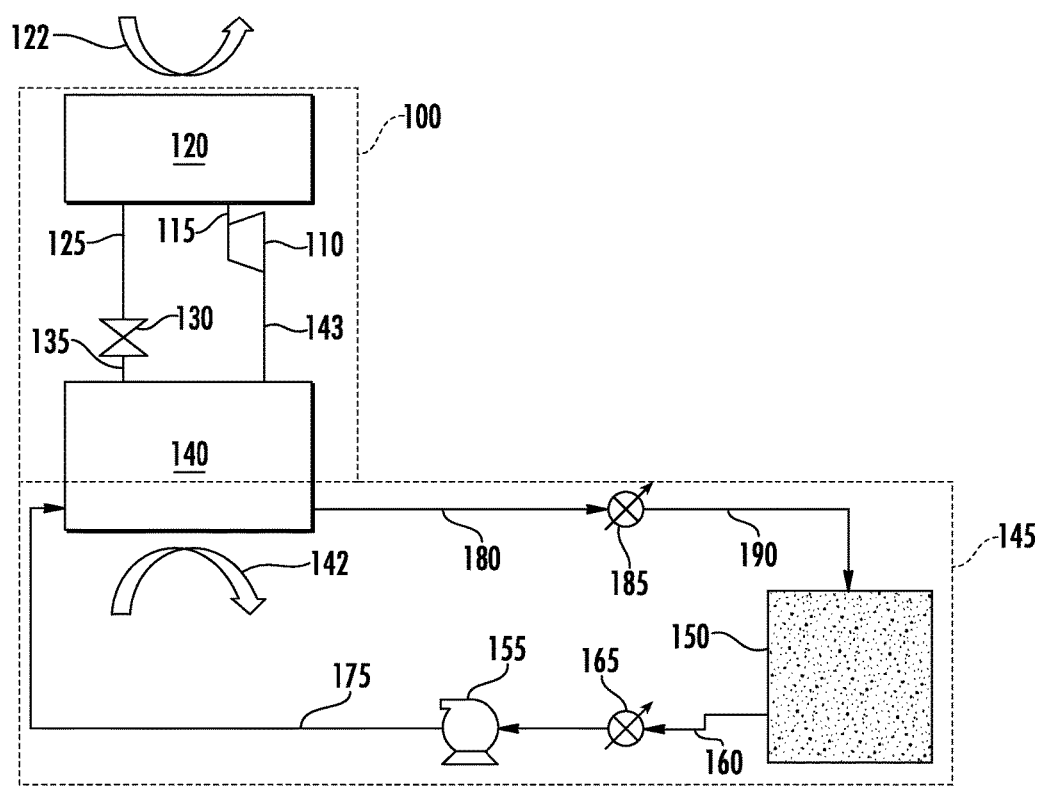
FIG. 2 is a block schematic diagram depicting an exemplary embodiment of a refrigeration system as described herein.

Another exemplary heat transfer system that also includes a vapor compressor refrigerant system is shown in block diagram form in FIG. 2. As shown in FIG. 2, a compressor 110 in refrigerant circulation loop 100 pressurizes a refrigerant (not shown) in its gaseous state, which both heats the refrigerant and provides pressure to circulate it throughout the system. The hot pressurized gaseous refrigerant exiting from the compressor 110 flows through conduit 115 to heat exchanger condenser 120, which functions as a heat exchanger to transfer heat from the refrigerant to the surrounding environment, such as to air circulation 122 blown by a fan (not shown) across the heat exchanger condenser 120. The hot refrigerant condenses in the heat exchanger condenser 120 to a pressurized moderate temperature liquid. The liquid refrigerant exiting from the condenser 120 flows through conduit 125 to expansion device 130, where the pressure is reduced. The reduced pressure liquid refrigerant exiting the expansion device 130 flows through conduit 135 to the heat exchanger evaporator 140, from which it flows through conduit 143 to the inlet of compressor 110, thus completing the loop. The heat exchanger evaporator 140 functions as a heat exchanger to absorb heat from (i.e., cool or condition) a fluid such as air in a space to be air conditioned or refrigerated depicted in FIG. 1 as air flow 142 that flows across the heat exchanger evaporator 140. Alternatively, the fluid being cooled by heat exchanger evaporator can be a heat transfer fluid like water, with water chilled by the heat exchanger evaporator 140 flowing in a secondary heat transfer circuit through another heat exchanger (not shown) across which air to be conditioned or refrigerated is passed. Additionally, as is known in the art, the system can also be operated in heat pump mode using a standard multiport switching valve to reverse refrigerant flow direction and the function of the condenser and evaporator heat exchangers, i.e. the condenser in cooling mode being evaporator in heat pump mode and the evaporator in cooling mode being the condenser in heat pump mode.

Figure 3A:
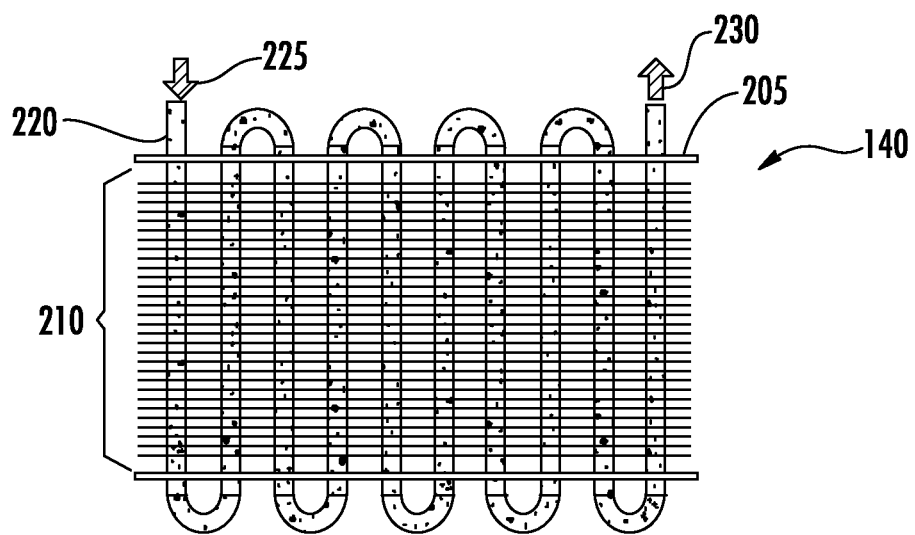
FIGS. 3A and 3B depict top and side views of an exemplary heat exchanger evaporator unit used in a refrigeration system as described herein.
Figure 3B:
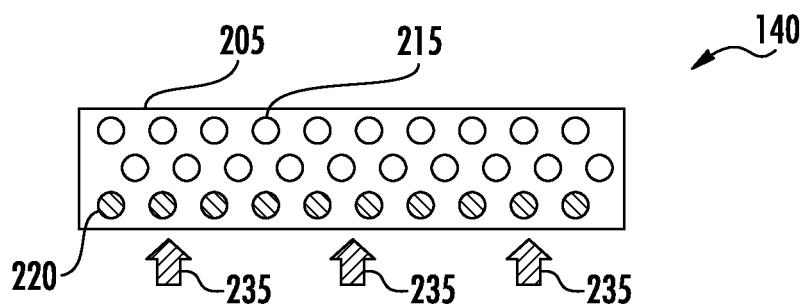

Further details of heat exchanger/evaporator 140 are shown in FIGS. 3A and 2B, which depict a top view and side view, respectively, of the heat exchanger evaporator 140. As shown in FIGS. 3A and 3B, heat exchanger/evaporator 140 has a housing 205 having fins 210 disposed therein as can be typically found in a fin tube heat exchanger. In addition to providing a mounting structure for the fins and tubes in the heat exchanger/evaporator 140, the housing 205 also provides an enclosure for a flow path of conditioned fluid 235, which can be air or water, for example, as described above. Refrigerant tubes 215 are disposed in the housing 205 intersecting and in thermal contact with the fins 210. Note that, as used herein, the plural "tubes" can refer to multiple tubes routed in parallel through the heat exchanger/evaporator 140 or a single tube with multiple tube length passes through the heat exchanger/evaporator 140. For ease of illustration, refrigerant tubes 215 are not shown in FIG. 2A (they are shown in FIG. 2B), but are routed through the housing 205 and the fins 210 in similar fashion as the PCM tubes 220 that are shown in FIG. 2A. The routing of both the PCM tubes 220 and the refrigerant tubes 215 through the same rack of fins 210 provides a conductive thermal connection between the refrigerant and the phase change material through the tube walls and the fins.

Referring now to FIGS. 2 and 3A, a PCM composition is disposed in PCM tubes 220 and can circulate in PCM loop 145 between the heat exchanger/evaporator 140 and a PCM reservoir 150. Specifically, the PCM composition is drawn from PCM reservoir 150 by pump 155 through conduit 160, valve 165, and conduit 170, and then through conduit 175 to PCM tube inlet 225. The PCM composition flows through PCM tubes 220 and then exits the heat exchanger/evaporator 140 through PCM tube outlet 230, from which it flows through conduit 180, valve 185, and conduit 190 to return to the PCM reservoir 150. In an alternative embodiment (not shown), PCM tubes 220 are not connected to a PCM composition loop 145, and the phase change material is instead statically contained in the PCM tubes 220. In the exemplary system of FIG. 1, the rate of heat transfer to or from the PCM can be controlled by controlling the speed of the pump 155 and/or the position of the valve 160 and valve 185. In some embodiments (not shown), the PCM composition can be routed through or across the heat exchanger evaporator 140 or the heat exchanger condenser 120, either of which can be configured as a multi-sided heat exchanger to accommodate refrigerant, PCM composition, and conditioned fluid and provide parallel thermal flow paths. More specifically, the PCM composition can be routed to the heat exchanger condenser 120, now used as a heat sink.

During one mode of operation, while compressor 110 is on, the PCM composition having an effective solidification temperature at, for example, 5° C. can be cooled down to or below the solidification temperature and cooling capacity is stored into the PCM composition inside the PCM reservoir 150. The temperature of the PCM slurry stays at near the solidification temperature until all of the PCMs with solidification temperature greater than 5° C. inside the PCM reservoir 150 solidify. During this time, the refrigerant in refrigerant tubes 205 also cools the conditioned fluid (e.g., air) while simultaneously transferring heat from the PCM composition, thus storing cooling capacity in the PCM reservoir 150. This parallel thermal coupling between the conditioned fluid and the PCM and refrigerant offers an alternative thermodynamic efficiency profile to the traditionally used refrigerant-PCM-air serial coupling while providing the benefits of PCM thermal energy storage such as managing diurnal external temperature cycles and refrigeration load variability.

In addition to the above-described mode of operation, other modes of operation can be readily provided by the refrigerant system. For example, in another mode of operation, pre-stored cooling capacity stored in the PCM storage reservoir can be used to increase the effective system cooling capacity during temporary periods of high demand such as following loading operations into or out of a refrigerated truck or other refrigerated space. When the PCM composition pump and the compressor run at the same time, the expanded refrigerant and the cooling from the PCM composition circulating through the PCM storage reservoir and the evaporator heat exchanger can cool the load at the same time or the PCM composition flowing through the condenser can function as a heat sink. In yet another mode of operation, pre-stored cooling capacity in the PCM can be used to provide an efficient alternative to system control utilizing a variable speed compressor. In this mode, the PCM can provide variable cooling capacity to supplement operation of the refrigerant loop with the compressor operating at a fixed speed, thus avoiding the inefficiencies of on/off control without the use of a variable speed compressor. When both the PCM composition pump and compressor run at speed, the storage is charged. The charged cooling capacity can be discharged at a partial load while the compressor is turned off.

As mentioned above, the phase change composition comprises a first PCM that is a plant or animal or paraffinic oil, having a first melting point or solidification temperature, and a second PCM that is a plant or animal or paraffinic oil, having a second melting point or solidification temperature lower than the first melting point or solidification temperature. Exemplary oils and their melting points are set forth below in Table 1.

TABLE 1

| Oil | Melting Point (° C.) | Melting Point (° F.) |
| --- | --- | --- |
| Castor oil | −18 | −0.4 |
| Coconut oil | 25 | 77 |
| Corn oil | −9.72 | 14.5 |
| Cottonseed oil | −1 | −30.2 |
| Linseed oil | −24 | −11.2 |
| Mutton tallow | 42 | 107.6 |
| Olive oil | −6 | 21.2 |
| Palm kernel oil | 24 | 75.2 |
| Palm oil | 35 | 95 |
| Peanut oil | 3 | 37.4 |
| Rapeseed oil | −10 | 14 |
| Sunflower oil | −17 | 1.4 |
| Soybean oil | −16 | 3.2 |
| Tung oil | −2.5 | 27.5 |

The heat transfer system provides phase change performance (i.e., will transfer heat to or from one or more of the components of the composition through latent heat of fusion) if the flow path through the heat exchanger is in heat absorption mode, a heat exchanger surface of the flow path through the heat exchanger in contact with the phase change composition has a temperature at or above the second melting point and at least a portion of the second PCM is in a solid state. The heat transfer system also provides phase change performance if the flow path through the heat exchanger is in heat rejection mode, a heat exchanger surface of the flow path through the heat exchanger in contact with the phase change composition has a temperature at or below the first solidification temperature, and at least a portion of the first PCM is in a liquid state. Of course, the system does not have to operate in a phase changing mode for all the PCMs all of the time, and can operate in non-phase change modes for some of the PCMs as well. For example, the system can operate in a heat rejection phase changing mode as successively larger portions of the first PCM is solidified, and then operate in a sub-cooling mode as the temperature of the solidified first PCM and the still liquid second PCM drops, until the solidification temperature of the second PCM is reached and the system operates in phase changing mode again as the second PCM begins to solidify. Similarly, the system can operate in a heat absorption phase changing mode as successively larger portions of the second PCM melts, and then operate in a non-phase changing mode as the temperature of both of the liquid second PCM and the still solid first PCM increases, until the melting point of the first PCM is reached and the first PCM begins to melt and the system again operates in phase changing mode. Heating could continue above the melting point of the first PCM in the heat absorption mode.

The phase change composition can also contain plant or animal or paraffinic oil PCMs in addition to the first and second PCMs (or non-oil PCMs such as concentrated salt solutions) in order to provide multiple phase change temperature points or ranges, depending on system operating design. The selection of the first and second PCMs, and any additional PCMs, can vary depending on the operating parameters of the particular system. For example, a composition of coconut oil (melting point 25° C.) and corn oil (melting point −9.72° C.) with a 50%:50% ratio, can results in a mixture of an effective solidification point at about 15.55° C. In some embodiments, the PCMs in the phase change composition are selected so that each can provide phase change performance at different operating temperatures of the system. This is contrasted to prior art emulsions and microencapsulated dispersions where the liquid carrier generally stays in its liquid form at all times. Additionally, the PCMs tend to be compatible or even fully miscible in the liquid phase, and also compatible in mixed phases where one or more PCMs in liquid phase and one or more PCMs is in solid phase, so that the requirement for emulsifying or dispersing agents can be reduced or eliminated.

In some embodiments, the flow path of the PCM composition through the heat exchanger is in thermal communication with a vapor compression refrigerant system. In some exemplary embodiments, a PCM composition has solidification temperatures ranging from −50° C. to 50° C., and includes a first PCM having a melting point ranging from 5° C. to 50° C., and a second PCM having a melting point ranging from −50° C. to 13° C. An exemplary use of such a PCM composition would be for receiving and storing heat from a conditioned fluid in a vapor compression refrigerant system. In some exemplary embodiments, a PCM composition has solidification temperatures ranging from −50° C. to 7° C., and includes a first PCM having a melting point ranging from −10° C. to 7° C. and a second PCM having a melting point ranging from −50° C. to 0° C. An exemplary use of such a PCM composition would be for storing heat from and/or transferring stored heat to an evaporator in a vapor compression heat transfer system. In some exemplary embodiments, a PCM composition has solidification temperatures ranging from 0° C. to 50° C., and includes a first PCM having a solidification temperature ranging from 13° C. to 50° C. and a second PCM having a solidification temperature ranging from 0° C. to 25° C. An exemplary use of such a PCM composition would be for storing heat from and/or transferring stored heat to a condenser in a vapor compression heat transfer system. The heat exchanger and its connections can be configured for the PCM composition to thermally communicate independently with any of a conditioned fluid, evaporator, or condenser of a vapor compression heat transfer system. In some embodiments, the PCM flow path can thermally communicate in parallel with one or more of the conditioned fluid, evaporator, or condenser, as disclosed in U.S. patent application Ser. No. 61/718,450 and PCT/US2013/056453, the disclosures of which are incorporated by reference herein in their entirety.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of transferring heat, comprising
flowing a phase change composition through a flow path in a heat exchanger between an inlet and an outlet of the heat exchanger, and a fluid circulation loop external to the heat exchanger connecting the outlet to the inlet;
wherein the phase change composition comprises a first PCM that is a plant or animal or paraffinic oil having a first melting point and a second PCM that is a plant or animal or paraffinic oil having a second melting point lower than the first melting point;
wherein a surface of the flow path through the heat exchanger in contact with the phase change composition has a temperature at or above the second melting point in a heat absorption mode, or has a temperature at or below the first melting point in a heat rejection mode;
wherein the heat absorption mode includes a first heat absorption phase change mode as successively larger portions of the second PCM melt, then a heat absorption non-phase changing mode as the temperature of both of the liquid second PCM and the still solid first PCM increases, and then a second heat absorption phase change mode as the melting point of the first PCM is reached and the first PCM begins to melt;
wherein the heat rejection mode includes a first heat rejection phase change mode as successively larger portions of the first PCM solidify, then a heat rejection non-phase changing mode as the temperature of the solidified first PCM and the still liquid second PCM drops, and then a second heat rejection phase change mode as the solidification temperature of the second PCM is reached and the second PCM begins to solidify.

2. The heat transfer system of claim 1, wherein the fluid circulation loop further comprises a reservoir for the phase change composition.

3. The method of claim 1, further comprising operating a vapor compression refrigerant system in thermal communication with the flow path through the heat exchanger.

4. The method of claim 3, wherein the flow path through the heat exchanger is in thermal communication with a conditioned fluid in the vapor compression refrigerant system.

5. The method of claim 3, wherein the flow path through the heat exchanger is in thermal communication with a refrigerant in the vapor compression refrigerant system.

6. The method of claim 5, wherein the flow path through the heat exchanger is in thermal communication with an evaporator in the vapor compression refrigerant system.

7. The method of claim 5, wherein the flow path through the heat exchanger is in thermal communication with a condenser in the vapor compression refrigerant system.

* * * * *